(12) United States Patent
Sattler et al.

(10) Patent No.: US 11,000,971 B2
(45) Date of Patent: May 11, 2021

(54) METHOD FOR OPERATING A MACHINE TOOL, AND MACHINE TOOL OPERABLE BY THE METHOD

(71) Applicant: Hilti Aktiengesellschaft, Schaan (LI)

(72) Inventors: Christian Sattler, Biessenhofen (DE); Tobias Drexl, Weil (DE)

(73) Assignee: Hilti Aktiengesellschaft, Schaan (LI)

( * ) Notice: Subject to any disclaimer, the term of this patent is extended or adjusted under 35 U.S.C. 154(b) by 139 days.

(21) Appl. No.: 16/084,748

(22) PCT Filed: Mar. 13, 2017

(86) PCT No.: PCT/EP2017/055766
§ 371 (c)(1),
(2) Date: Sep. 13, 2018

(87) PCT Pub. No.: WO2017/157815
PCT Pub. Date: Sep. 21, 2017

(65) Prior Publication Data
US 2019/0077046 A1 Mar. 14, 2019

(30) Foreign Application Priority Data
Mar. 14, 2016 (EP) .................................... 16160122

(51) Int. Cl.
*B23B 35/00* (2006.01)
*B28D 7/00* (2006.01)
(Continued)

(52) U.S. Cl.
CPC .............. *B28D 7/005* (2013.01); *B23B 35/00* (2013.01); *B23B 45/02* (2013.01); *B28D 1/14* (2013.01);
(Continued)

(58) Field of Classification Search
CPC ................................ B28D 7/005; B23B 45/02
(Continued)

(56) References Cited

U.S. PATENT DOCUMENTS 4,554,980 A * 11/1985 Doniwa ................ B25B 23/147
173/176
5,339,908 A * 8/1994 Yokota .................. B25B 23/141
173/216

(Continued)

FOREIGN PATENT DOCUMENTS

EP   2 085 191 A1   8/2009
EP   2 650 085 A2   10/2013
(Continued)

OTHER PUBLICATIONS

PCT/EP2017/055766, International Search Report (PCT/ISA/220 and PCT/ISA/210) dated May 19, 2017, with partial English translation, enclosing Written Opinion of the International Searching Authority (PCT/ISA/237) (Eighteen (18) pages).

*Primary Examiner* — Gloria R Weeks
(74) *Attorney, Agent, or Firm* — Crowell & Moring LLP

(57) ABSTRACT

A method for operating a machine tool that includes an electric motor for driving a drilling tool and an open- and closed-loop controller for open- and closed loop control of the motor power. The method includes: operating the machine tool in a tapping mode at a first rotational speed value, where the first rotational speed value is lower than a predetermined idling speed value of the electric motor; detecting a predetermined first threshold value for the motor current; reducing the motor current to a predetermined second threshold value when the first threshold value is exceeded; operating the machine tool at a second rotational speed value, where the second rotational speed value is lower than the first rotational speed value; operating the electric motor at a predetermined motor current value; and (Continued)

operating the controller for closed loop control of the motor power via the motor current with an oscillating action.

5 Claims, 3 Drawing Sheets

(51) Int. Cl.
    *B28D 1/14*           (2006.01)
    *B23B 45/02*         (2006.01)

(52) U.S. Cl.
    CPC ..... *B23B 2226/75* (2013.01); *B23B 2260/128* (2013.01); *B23B 2270/48* (2013.01)

(58) Field of Classification Search
    USPC ........................................................ 173/2, 11
    See application file for complete search history.

(56) References Cited

U.S. PATENT DOCUMENTS

| | | | | |
|---|---|---|---|---|
| 6,286,609 B1 * | 9/2001 | Carrier | .................... | H02P 7/288 173/1 |
| 6,550,545 B1 * | 4/2003 | Manschitz | ........... | B25D 16/006 173/170 |
| 6,655,470 B1 * | 12/2003 | Chen | ........................ | B25B 17/00 173/216 |
| 6,796,291 B2 * | 9/2004 | Suzuki | .................. | F02B 61/045 123/463 |
| 6,984,188 B2 * | 1/2006 | Potter | .................... | B23Q 5/142 173/178 |
| 7,121,361 B2 * | 10/2006 | Hara | ..................... | B25B 23/141 173/176 |
| 7,316,529 B2 * | 1/2008 | Phillips | ................. | B23B 31/008 144/136.95 |
| 7,350,595 B2 * | 4/2008 | Sato | ........................ | B28D 1/041 175/195 |
| 7,882,899 B2 * | 2/2011 | Borinato | ................ | B23B 45/008 173/176 |
| 7,931,095 B2 * | 4/2011 | Machida | ............... | B25D 11/062 173/48 |
| 8,028,760 B2 * | 10/2011 | Yoshikane | ........... | B25D 16/006 173/48 |
| 8,286,724 B2 * | 10/2012 | Furusawa | .............. | B25D 11/10 173/47 |
| 8,439,126 B2 * | 5/2013 | Bosch | ..................... | H02M 1/44 173/176 |
| 8,511,399 B2 * | 8/2013 | Kunz | ....................... | H01H 3/20 173/48 |
| 9,333,563 B2 | 5/2016 | Uchiuzo et al. | | |
| 10,160,139 B2 | 12/2018 | Pfeiffer et al. | | |
| 10,220,500 B2 | 3/2019 | Lim et al. | | |
| 10,222,784 B2 | 3/2019 | Drexl et al. | | |
| 10,413,974 B2 | 9/2019 | Koslowski et al. | | |
| 10,583,582 B2 * | 3/2020 | Drexl | ..................... | B28D 7/005 |
| 2012/0320479 A1 * | 12/2012 | Ohtsuka | ................. | B23B 45/02 361/87 |
| 2016/0151934 A1 * | 6/2016 | Pfeifer | ................... | B23Q 15/08 700/173 |

FOREIGN PATENT DOCUMENTS

| | | |
|---|---|---|
| EP | 2 826 609 A1 | 1/2015 |
| EP | 2 835 198 A1 | 2/2015 |
| EP | 2 887 167 A1 | 6/2015 |
| JP | 9-277195 A | 10/1997 |
| RU | 2 570 267 C2 | 8/2014 |
| WO | WO 2015/007875 A1 | 1/2015 |

* cited by examiner

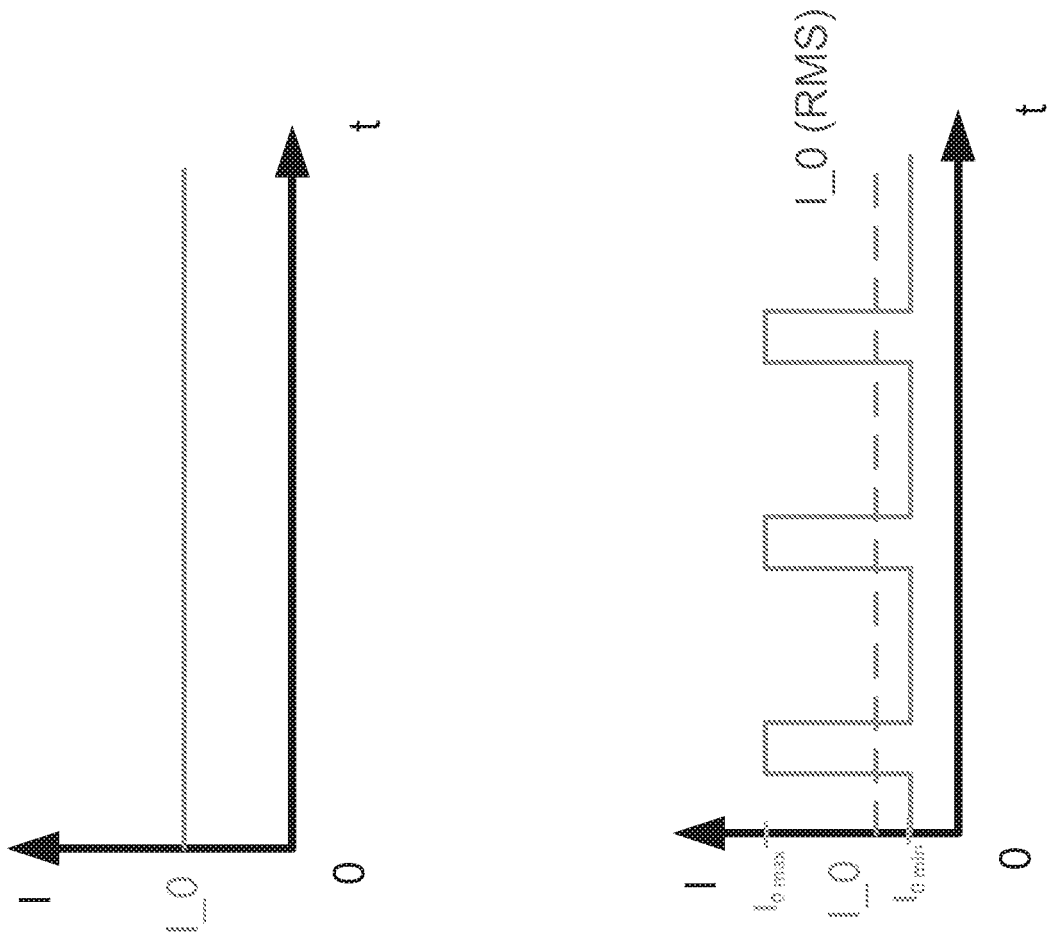

METHOD FOR OPERATING A MACHINE TOOL, AND MACHINE TOOL OPERABLE BY THE METHOD

CROSS REFERENCE TO RELATED APPLICATIONS

This application claims the priority of International Application No. PCT/EP2017/055766, filed Mar. 13, 2017, and European Patent Document No. 16160122.4, filed Mar. 14, 2016, the disclosures of which are expressly incorporated by reference herein.

BACKGROUND AND SUMMARY OF THE INVENTION

The invention relates to a method for operating a machine tool, in particular a core drill, comprising an electric motor for driving a drilling tool, in particular a core drill bit, and comprising an open- and closed-loop controller for open- and closed loop control of the motor current of the electric motor. The invention further relates to a machine tool operable by the method.

Cutting tools like core drill bits are made to rotate by core drills in order to cut holes in hard materials. The materials may be, for example, concrete, cement, brickwork, or the like. To properly cut a hole into the hard material, the core drill bit is attached to the core drill and brought into rotational motion with the assistance of the core drill's electric motor. The core drill is typically attached to the particular material into which the hole is to be cut with the assistance of a drill stand. The drill stand is attached to the material (i.e., for example, screwed to or interlocked with it or attached by a vacuum device at the foot of the drill stand). For practical purposes, a propulsion device is positioned between the core drill and the drill stand. The purpose of the propulsion device is to move the core drill together with the core drill bit along the drill stand. The propulsion device can be operated either manually by the user, i.e., with the assistance of a hand wheel, or automatically, i.e., by its own drive motor. In the automatic variation of the propulsion device, the movement process or push along the drill stand takes place following a saved program.

To allow for precise positioning at the start of the core drilling process and to prevent the core drill bit from slipping on the material being processed, the core drilling process typically begins with a so-called tapping mode. In this mode, the core drill bit is operated at a relatively low rotational speed. The propulsion device simultaneously drives the core drill, together with the slowly rotating core drill bit, in the direction of the material, likewise at a relatively slow speed.

After the core drill bit comes into contact with the surface of the material (e.g., concrete), it is pressed to the material with a relatively low contact pressure. As the material is typically relatively hard, if the contact pressure on the core drill bit is too high, the core drill bit's rotational speed may drop sharply or the core drill bit may come to a complete stop.

The low rotational speed also reduces the drilling and cutting power of the core drill bit, allowing only little drilling heading into a hard material.

The aim of the invention is therefore to specify a method for operating a machine tool, in particular a core drill, that solves the problem described above and can in particular achieve a sufficiently high drilling and cutting power of the core drill bit at a relatively low rotational speed.

The aim is therefore achieved by a method for operating a machine tool, in particular a core drill, comprising an electric motor for driving a drilling tool, in particular a core drill bit, and comprising an open- and closed-loop controller for open- and closed-loop control of the motor power by means of the motor current of the electric motor.

According to the invention, the method comprises the following method steps:

- operating the machine tool in a tapping mode at a first rotational speed value, wherein the first rotational speed value is lower than a predetermined idling speed value of the electric motor;
- detecting a predetermined first threshold value for the motor current;
- reducing the motor current to a predetermined second threshold value when the first threshold value for the motor current is exceeded;
- operating the machine tool at a second rotational speed value, wherein the second rotational speed value is lower than the first rotational speed value;
- operating the electric motor at a predetermined motor current value; and
- operating the open- and closed-loop controller for closed loop control of the motor power by means of the motor current with an oscillating motion.

The oscillating motion of the open- and closed-loop controller causes current to be fed into the electric motor in pulses, allowing sufficiently high drilling and cutting power of the core drill bit to be achieved at a relatively low rotational speed. A controlled and evenly paced heading into the material being processed is achieved with the assistance of the increased power at low rotational speed.

In an advantageous embodiment of the present invention, it is possible for the predetermined threshold value to be the transition point for the motor current.

In another advantageous embodiment of the present invention, it is possible for the predetermined motor current value to be the holding current for the motor current.

It is also the aim of the invention to specify a machine tool that can implement the method described above.

In an advantageous embodiment of the present invention, it is possible for the electric motor to be a universal motor.

Further advantages become evident from the following description of the drawings. The Figures illustrate various example embodiments of the present invention. The Figures, the description, and the claims contain numerous features in combination. The person skilled in the art will also consider the features individually and synthesize them into meaningful additional combinations as useful.

Identical and similar components are labelled by the same reference symbols in the Figures.

BRIEF DESCRIPTION OF THE DRAWINGS

FIG. 4 is a graphical depiction of the motor current profile with a holding current value; and FIG. 5 is a graphical depiction of the motor current profile with oscillating motion of the closed-loop control unit.

DETAILED DESCRIPTION OF THE DRAWINGS

Figure 1:
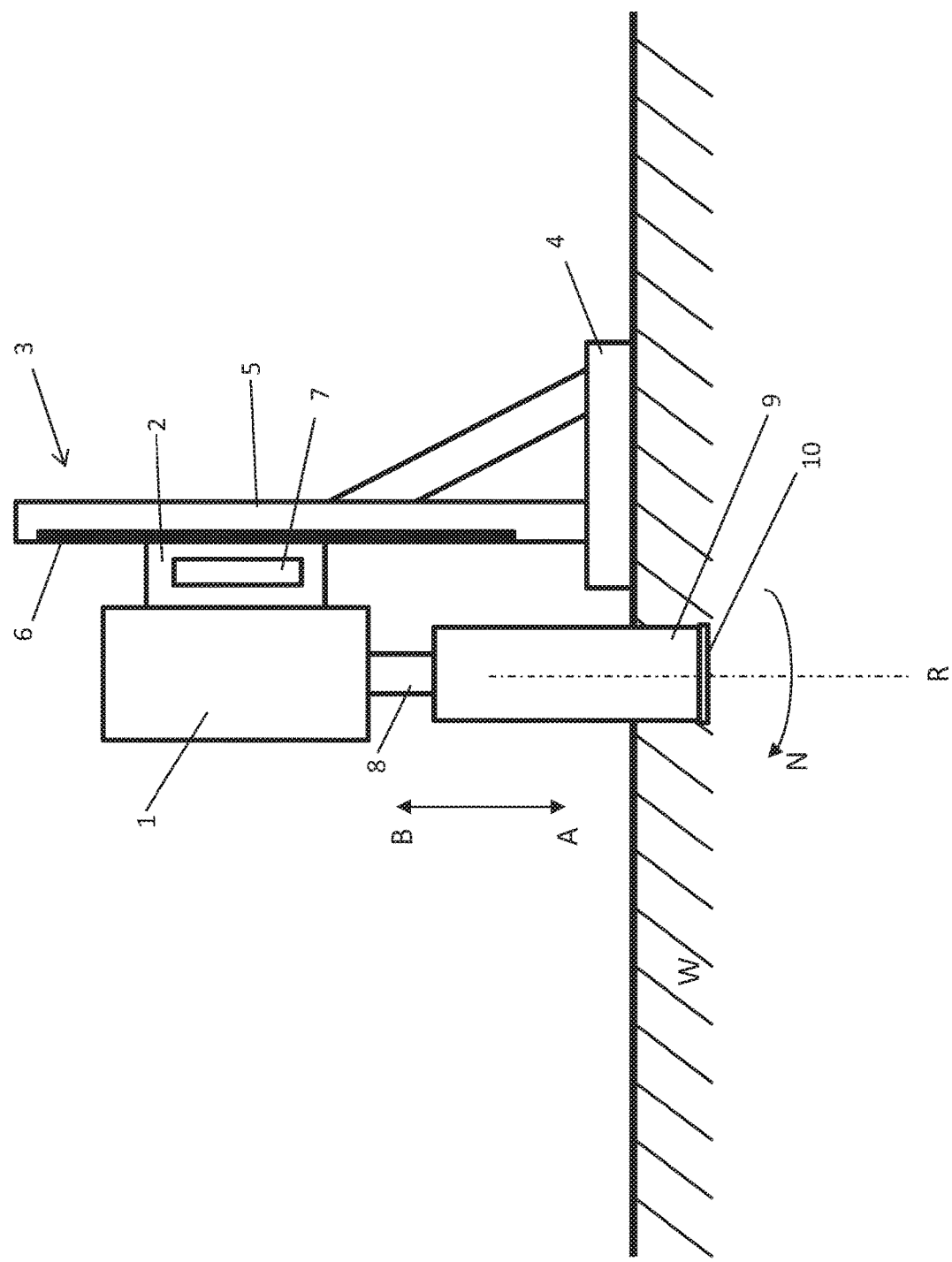
FIG. 1 is a schematic depiction of a machine tool as described in the invention.

FIG. 1 shows a machine tool 1 as in the present invention. The machine tool 1 is a core drill for cutting holes in hard materials W such as concrete, cement, brickwork, or the like.

The machine tool formed as a core drill 1 is movably attached to a drill stand 3 by a drive device 2. The drill stand 3 comprises essentially a foot mechanism 4 and a guide rail 5. As shown in FIG. 1, the foot mechanism 4 can be fastened horizontally to a substrate W to be processed. The fastening is done by screws that are not shown in the Figures. However, it is also possible for the fastening to be done by interlocking or by a vacuum device on the foot mechanism of the drill stand 3. The vacuum device generates negative pressure that holds the drill stand to the ground. The interlocking or vacuum device are not shown in the Figures.

Alternatively, the foot mechanism 4 can also be fastened to a vertical wall or inclined plane so that the whole drill stand 3 can be mounted or held to the vertical wall or inclined plane. The guide rail 5 extends at a 90° angle to the foot mechanism 4 (see FIG. 1). Alternatively, the guide rail 5 can also be attached to the foot mechanism 4 at an angle greater or lesser than 90°.

The guide rail 5 further contains a gear rod device 6 on one side that extends roughly the whole length of the guide rail 5.

As already mentioned above, the drive device 2 is positioned between the core drill 1 and the drill stand 3. The core drill 1 can be moved along the guide rail 5 of the drill stand 3 with the assistance of the drive device 2. In the example embodiment depicted in FIG. 1, the core drill 1 can be moved reversibly in arrow direction A or B. To do this, the drive device 2 possesses a first fastening device by which the core drill can be detachably attached to the housing of the drive device 2. The first fastening device is not depicted in the Figures.

In addition, the drive device contains a second fastening device by which the housing of the drive device 2 can be attached to the guide rail 5 of the drill stand. The second fastening device is also not depicted in the Figures. To do this, the second fastening device has a holding unit (not depicted) and a gear wheel unit (also not depicted). The drive device 2 is held to the guide rail 5 with the assistance of the holding unit. The congruently formed gear wheel interlocks with the gear rod device and in this way guides the drive device 2 along the guide rail 5. The drive device 2 has another drive in order to shift the gear wheel unit into rotational motion. The drive may be an electric motor with a gearbox or transmission unit. The electric motor may, for example, be a universal motor. However, other suitable electric motors are possible.

Neither the drive nor the gearbox or transmission unit are depicted in the Figures.

In an alternative embodiment (not depicted in the Figures), the drive device 2 can also have a hand wheel for manual actuation of the drive device instead of an electric motor as drive. The hand wheel is not depicted in the Figures.

The drive device 2 further comprises a closed- and open-loop controller by which the motion parameters, i.e., the speed, distance, start and end point of motion, and other parameters of the drive device relative to the drill stand can be subject to closed- or open-loop control. To allow operation by the user, the drive device 2 comprises a user interface 7 (called an MMI=man-machine interface) by which the drive device 2 can be operated.

The machine tool 1 formed as a core drill comprises essentially a housing, a drive unit, a transmission, an open- and closed-loop controller, an input shaft and an output shaft 8. The open- and closed-loop controller comprises a regulator for closed- and open-loop control of the motor current. The drive unit, the transmission, the controller, and the input shaft are not depicted in the Figures. A drill tool 9 in the form of a core drill bit is attached to the output shaft. The core drill bit 9 has a cutting edge 10 at one free end using which the material being processed can be cut in order to create a drill hole. To do this, the drive unit formed as an electric motor shifts the core drill bit 9 into rotational motion in the direction N. Both the core drill bit 9 and the output shaft rotate around the shared rotational axis R.

The purpose of the open- and closed-loop controller is open- and closed-loop control of the drive unit formed as an electric motor. It is in particular the rotational speed of the electric motor that is subject to open- or closed-loop control. In addition, a specific mode can be set accordingly to the particular situation of the drilling process. The open- and closed-loop controller possesses multiple modes. The gear can also be selected and set using the open- and closed-loop controller.

To execute the actual drilling process, the core drill 1 with its attached core drill bit 9 is positioned on and fastened to the material W being processed by the drill stand 3.

A gear is selected and set on the transmission of the core drill 1 using the open- and closed-loop controller. The gear being selected is determined by the diameter of the core drill bit 9 being used. The selected gear determines the electric motor's rotational speed at which it is to turn. The transmission and in particular the selected gear of the transmission allows the core drill bit 9 to turn at a corresponding rotational speed.

Next, an on- and off-switch on the core drill 1 is activated. The on- and off-switch is part of the open- and closed-loop controller and is not depicted in the Figures.

After the on- and off-switch is activated, the core drill bit 9 begins to turn in the direction N. The core drill bit 9 and in particular the cutting edge 10 of the core drill bit 9 are still located above the material W (in the arrow direction B) at the start of the drilling process. The position of the core drill bit 9 above the material W is not shown in the Figures.

At the start of the drilling process and in particular when the core drill bit 9 is still located above the material W being processed, a specific mode of operation of the core drill 1 is selected via an input on the open- and closed-loop controller. In this specific mode, the core drill bit 9 and/or the output shaft 8 turns at an idling speed (n0).

Then a second mode is selected via an input on the open- and closed-loop controller. This mode is called a tapping mode. In this tapping mode, the rotational speed of the core drill bit 9 and/or the output shaft 8 is reduced so that it is lower than the idling speed. The rotational speed in tapping mode is roughly 50% less than the idling speed (<50% of n0).

Thereafter the core drill 1 with the rotating core drill bit 9 is moved by the drive device 2 along the guide rail 6 of the drill stand 3 towards the material W (arrow direction A in FIG. 1).

As soon as the cutting edge 10 of the core drill bit 9 comes into contact with the surface of the material W, the core drill bit 9 is pressed against the material W with a relatively low contact pressure (arrow direction A) in order to cut a first guide channel into the surface of the material W. The contact pressure is generated by the drive device 2 and subjected to closed- or open-loop control by the closed- or open-loop controller of the drive device 2.

The depth in arrow direction A is typically between 2 and 5 mm. A relatively low contact pressure is needed for this, as otherwise the high resistance of the hard material W causes the rotational speed of the core drill bit 9 to drop too steeply and the core drill bit 9 may even come to a complete stop. If the rotational speed is too low, the power of the core drill bit 9 is also correspondingly reduced, i.e., in particular the cutting power of the core drill bit 9 in the material W, as a result of which adequate drilling progress cannot be achieved.

The machine tool 1 formed as a core drill further comprises a number of sensors that can measure the actual rotational speed of the output shaft 8 and the core drill bit 9 at any time. The sensors are not depicted in the Figures. The values measured by the sensors are forwarded to the open- and closed-loop controller of the core drill 1 and to the open- and closed-loop controller of the drive device 2 for analysis.

If the contact pressure of the core drill 9 on the material W exceeds a certain threshold value, a predetermined first threshold value for the motor current can be determined using the sensors. The first threshold value is predetermined by a control voltage supply discharge. The predetermined first threshold value indicates an overly strong reduction of rotational speed as a result of the overly large contact pressure and a corresponding drop in the power of the core drill bit 9. The predetermined first threshold value can be the so-called transition point for the motor current ($I_{trans}$) of the electric motor.

An overly strong rotational speed reduction and an associated drop in power mean in this context that the core drilling process can no longer be executed efficiently (i.e., very slow drilling progress) or even that the core drill bit 9 has come to a complete stop in the material W. The overly strong rotational speed reduction and the corresponding drop in power of the core drill bit 9 are routed to the open- and closed-loop controller of the core drill 1 and to the open- and closed-loop controller of the drive device 2. As a result of this, the open- and closed-loop controller of the core drill 1 imposes a so-called holding current $I_0$ on the electric motor. After a reduction of the core drill bit's 9 contact pressure against the material W and an associated drop in the resistance to the electric motor of the core drill 1, the holding current $I_0$ acts to increase the rotational speed of the core drill bit 9 again. The core drill 1 need not be fully stopped first (i.e., rotational speed is zero) and the rotational speeds then slowly increased again. The present invention thereby makes it possible to operate the core drill 1 with fewer and/or shorter interruptions. As a result of this, the core drilling process as a whole can be organized in a considerably more efficient manner.

Figure 2:
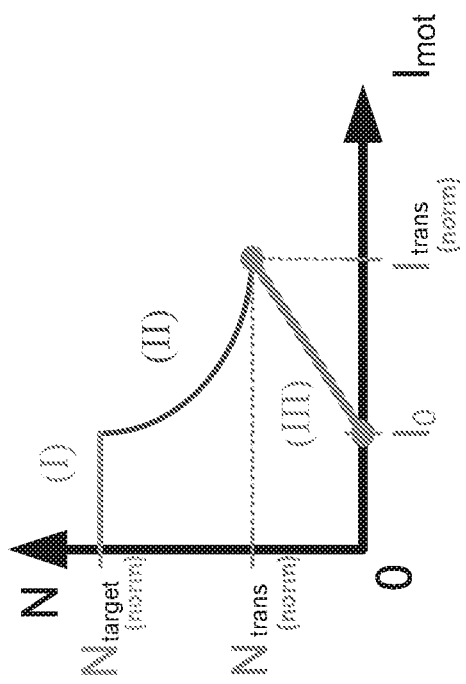
FIG. 2 is a graphical depiction of a motor characteristic at e.g., 20000 rpm.
Figure 3:
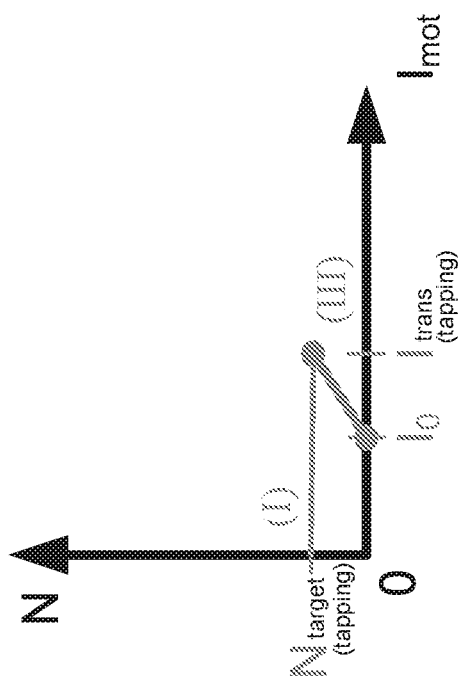
FIG. 3 is a graphical depiction of a motor characteristic with a corresponding reduction to 15% of the rotational speed value in FIG. 1.

FIGS. 2 and 3 show the graphical behavior of the rotational speed N of the electric motor at the motor current $I_{mot}$ given the use of a core drill 1 with a rotational speed of, for example, 20,000 rpm (=revolutions per minute) during a core drilling process. Starting from the transition point ($N_{trans}$, $I_{trans}$), the holding current $I_0$ is imposed on the electric motor.

The section labelled I depicts the normal rotational speed control. The section labelled II depicts the rotational speed control on a natural characteristic curve (i.e., manipulated variable: power=100%). The section labelled III depicts the current control.

FIG. 3, in contrast, shows the graphical behavior of the rotational speed N of the electric motor at the motor current $I_{mot}$ given the use of a core drill 1 with reduced rotational speed in tapping mode during the tapping phase of the core drilling process. The reduction of the rotational speed is, for example, 15% of the idling speed before the start of the core drilling process.

A comparison of the graphical behavior in FIGS. 2 and 3 to each other shows that in FIG. 3, in contrast to FIG. 2, the transition point is earlier or is reached relatively early. For example, the transition point for the motor current given the use of a core drill 1 with a rotational speed of, for example, 20,000 rpm during a core drilling process is approx. 19 A. In comparison, the transition point for the motor current given the use of a core drill 1 with reduced rotational speed (15% of idling speed) in tapping mode during the tapping phase of the core drilling process is only 13 A.

After the transition point is exceeded (see FIG. 3), the holding current is approx. 8.5 A (see FIG. 4). However, this means that given a corresponding rotational speed only very little power is available to continue turning the core drill bit 9 after stoppage. The rotational speed can drop to zero (i.e., complete stop) here.

The open- and closed-loop controller of the core drill 1 allows the electric motor to pulse because the regulator for closed- and open-loop control of the motor current vacillates (oscillating motion). The resulting current curve is shown in the graphical depiction in FIG. 5. Care should be taken that the RMS value (effective value) of the motor current does not exceed predetermined threshold values. The pulses given to the electric motor can be random or subject to open- or closed-loop control.

Because of the oscillating motion or vacillation of the regulator, the power output of the core drill bit 9 is increased at a low rotational speed.

The invention claimed is:

1. A method for operating a machine tool, wherein the machine tool includes an electric motor for driving a core drill bit and an open- and closed-loop controller for open- and closed-loop control of a power of the electric motor via a motor current of the electric motor, comprising the steps of:
    operating the machine tool in a tapping mode at a first rotational speed value, wherein the first rotational speed value is lower than a predetermined idling speed value of the electric motor;
    detecting a predetermined first threshold value for the motor current;
    reducing the motor current to a predetermined second threshold value when the first threshold value for the motor current is exceeded;
    operating the machine tool at a second rotational speed value, wherein the second rotational speed value is lower than the first rotational speed value;
    operating the electric motor at a predetermined motor current value, wherein the predetermined motor current value is a holding current for the motor current and wherein the holding current increases a rotational speed of the core drill bit after a reduction of a contact pressure of the core drill bit against a material and an associated drop in a resistance to the electric motor; and
    operating the open- and closed-loop controller for closed loop control of the motor power via the motor current with an oscillating motion.

2. The method according to claim 1, wherein the predetermined first threshold value is a transition point for the motor current.

3. The method according to claim 1, wherein the machine tool is a core drill.

4. A machine tool operable by the method according to claim 1.

5. The machine tool according to claim 4, wherein the electric motor is a universal motor.

* * * * *